(No Model.)

A. D. GOODWIN.
COFFEE ROASTER.

No. 461,783. Patented Oct. 20, 1891.

WITNESSES:
Villette Anderson,
George H Parmelee

INVENTOR
A. D. Goodwin
BY
E. W. Anderson
his ATTORNEY.

UNITED STATES PATENT OFFICE.

ADOLPHUS D. GOODWIN, OF SALEM, VIRGINIA, ASSIGNOR OF ONE-HALF TO M. P. FRANTZ, OF SAME PLACE.

COFFEE-ROASTER.

SPECIFICATION forming part of Letters Patent No. 461,783, dated October 20, 1891.

Application filed April 22, 1891. Serial No. 389,939. (No model.)

*To all whom it may concern:*

Be it known that I, ADOLPHUS D. GOODWIN, a citizen of the United States, and a resident of Salem, in the county of Roanoke and State of Virginia, have invented certain new and useful Improvements in Coffee-Roasters; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
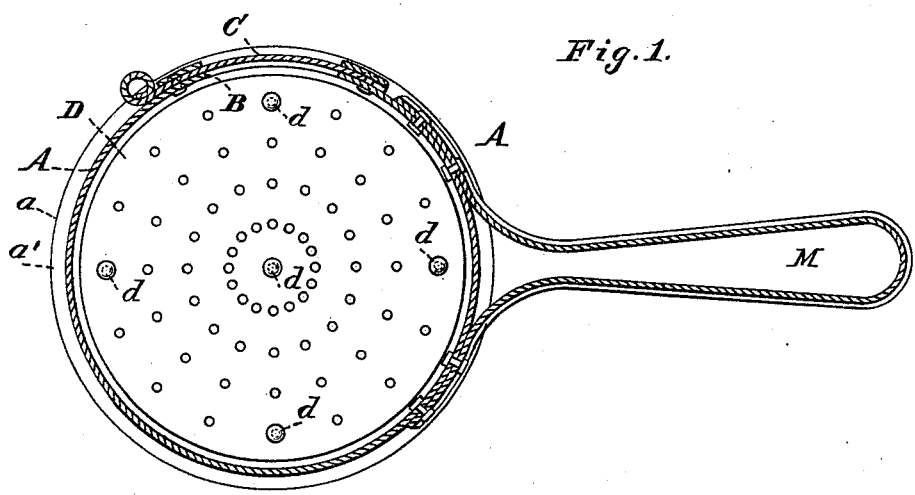
Figure 2:
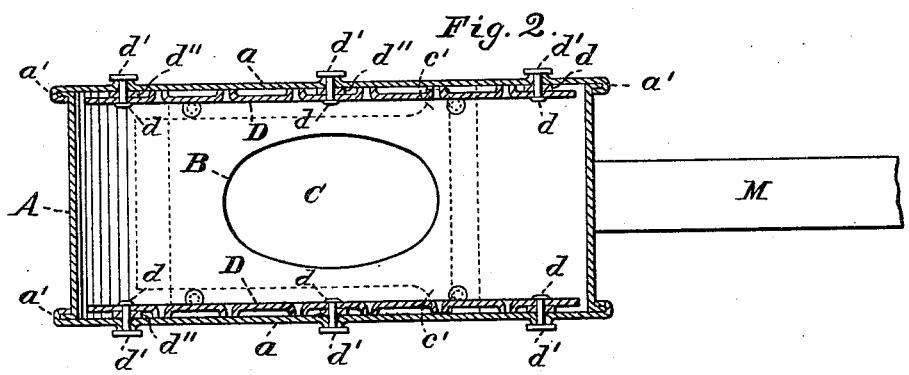
Figure 3:
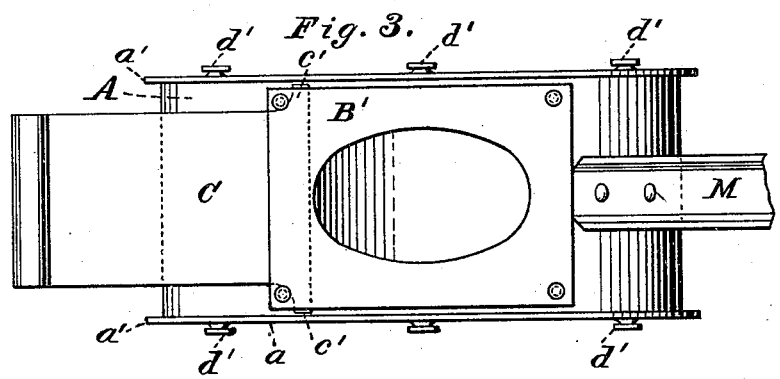

Figure 1 of the drawings is a representation of this invention and is a horizontal section. Fig. 2 is a vertical section, the handle being broken off. Fig. 3 is a side view.

This invention has relation to certain new and useful improvements in coffee-roasters; and it consists in the novel construction and combination of parts thereof, as hereinafter described and claimed.

In the accompanying drawings, illustrating the invention, the letter A designates the receptacle for the coffee, said receptacle being made of sheet metal and preferably circular or cylindrical in form, as shown. This receptacle consists of the cylindric body portion A, having secured thereto the circular end plates $a\,a$ by means of seams $a'$, no solder being used. In one side of the body portion is formed the filling opening or aperture B, around which is riveted the re-enforcing or guard strip B', forming a guide for the sliding door or cover C. The outer end of this cover is turned outwardly, as shown, presenting a shoulder or projection which may be engaged by a stove-iron or other suitable object for the purpose of withdrawing said cover when heated. Projections or stops $c'$ on its inner portion prevent its entire removal. On the inside of the receptacle, parallel to each end and separated therefrom by a short interval, is a circular perforated plate or disk D, which is held in place by the rivets $d$, extending through the end portions $a\,a$. These disks serve to prevent the coffee from coming in contact with the end portions and becoming burned or scorched thereby. The spaces between the disks and the end portions also serve as hot-air chambers. The rivets $d$ serve a double purpose. In addition to holding the disks D in place they are extended beyond the outer surface of the end portions, where they are provided with the heads $d'$. These heads, when the device is in use, serve to keep the end portions off the surface of the stove or heater and prevent their becoming worn by the continued shaking necessary.

It will be observed that the roaster is reversible, either end being capable of being applied to the heater, so that by changing ends as often as may be necessary during the operation of roasting the coffee is thoroughly and evenly cooked throughout.

When the cover C is closed, the receptacle is air-tight, preventing the escape of any of the volatile oils or aroma of the coffee during the roasting.

A suitable handle H is provided, riveted to the body portion of the receptacle, thus doing away with solder in the entire construction. In constructing the receptacles the circular end plates $a\,a$ are first perforated and the rivets $d$ inserted. Small washers $d$ are then placed on the rivets $d$ at the inner surface of the plates, the perforated disks applied, and the whole riveted together. The ends are then crimped to the cylindric body portion. The washers $h$ provide for the space between the end portions and the disks.

Having described this invention, what I claim as new, and desire to secure by Letters Patent, is—

1. The coffee-roaster comprising the receptacle having parallel to each end and separated therefrom by a short interval an interior disk or plate held in place by rivets, said rivets being extended through beyond the outer surfaces of the end portions of the receptacle, substantially as specified.

2. The coffee-roaster comprising the cylindric receptacle having parallel to each end and separated therefrom by a short interval a perforated disk or plate held in place by rivets, said rivets being extended through beyond the outer surfaces of the end portions of said receptacle and provided with heads thereat, substantially as and for the purpose specified.

3. The coffee-roaster comprising the cylindric body portion, the ends secured thereto, the inner disks parallel to said ends, and the handle secured by rivets, said body portion having the filling-aperture therein, the sliding cover for said aperture, and the shoulder and stops on said cover, substantially as specified.

In testimony whereof I affix my signature in presence of two witnesses.

ADOLPHUS D. GOODWIN.

Witnesses:
PHILIP C. MASI,
GEORGE H. PARMELEE.